(12) United States Patent
Xiang et al.

(10) Patent No.: US 10,554,156 B2
(45) Date of Patent: Feb. 4, 2020

(54) MOTOR DRIVING CIRCUIT, APPLICATION DEVICE INCLUDING THE SAME, AND BRAKING METHOD FOR A MOTOR

(71) Applicant: Johnson Electric S.A., Murten (CH)

(72) Inventors: You Qing Xiang, Shenzhen (CN); Shi Wen Wang, Shenzhen (CN); Wu Feng Qiu, Shenzhen (CN); Ying Chao Li, Shenzhen (CN); Yun Chen, Shen Zhen (CN); Lian Zhong Zhang, Shenzhen (CN); Jun Zhang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/692,256

(22) Filed: Aug. 31, 2017

(65) Prior Publication Data

US 2018/0062546 A1    Mar. 1, 2018

(30) Foreign Application Priority Data

Sep. 1, 2016  (CN) .......................... 2016 1 0800678
Sep. 1, 2016  (CN) .......................... 2016 1 0800679

(51) Int. Cl.
  *H02P 3/18*   (2006.01)
  *H02P 3/02*   (2006.01)
  *H02P 25/16*  (2006.01)

(52) U.S. Cl.
  CPC .................. *H02P 3/18* (2013.01); *H02P 3/02* (2013.01); *H02P 25/16* (2013.01)

(58) Field of Classification Search
  CPC ...... H02P 3/18; H02P 3/02; H02P 3/22; H02P 25/16
  USPC .......................................................... 318/362
  See application file for complete search history.

(56) References Cited

U.S. PATENT DOCUMENTS

| | | | | |
|---|---|---|---|---|
| 3,612,969 A | * | 10/1971 | Cockroft ................ | G05B 19/14 318/123 |
| 5,405,096 A | * | 4/1995 | Seol ....................... | A47J 19/027 241/282.1 |
| 5,705,904 A | * | 1/1998 | Kuriyama ................ | H02M 1/32 318/400.21 |
| 5,814,956 A | * | 9/1998 | Kono .................. | G05B 19/4063 318/380 |
| 5,844,343 A | * | 12/1998 | Horst ..................... | H02K 1/246 310/184 |
| 5,872,435 A | * | 2/1999 | Bolte ........................ | H02P 6/06 318/400.13 |

(Continued)

*Primary Examiner* — Kawing Chan
(74) *Attorney, Agent, or Firm* — Muncy, Geissler, Olds & Lowe, PC

(57) ABSTRACT

A motor driving circuit, an application device, and a motor braking method are provided. The driving circuit includes an inverter, a braking unit, and a MCU. The inverter is configured to drive a motor. The braking unit includes a sampling circuit, a discharge circuit, and a switch group. The MCU is connected to the sampling circuit, the discharge circuit, and the switch group, and is configured to control the sampling circuit to detect a voltage across the inverter and obtain a detected value when receiving the emergency signal, compare the detected value to a preset voltage or a preset voltage range, and transmit a control signal to activate the discharge circuit when the detected value is greater than the preset voltage or exceeds the preset voltage range.

17 Claims, 5 Drawing Sheets

(56) References Cited

U.S. PATENT DOCUMENTS

| | | | | |
|---|---|---|---|---|
| 6,078,156 A * | 6/2000 | Spurr | ............... | H02P 3/08 |
| | | | | 318/368 |
| 2004/0163551 A1 * | 8/2004 | Areh | ............... | A47J 19/027 |
| | | | | 99/501 |
| 2010/0079093 A1 * | 4/2010 | Kitanaka | ............... | B60L 3/003 |
| | | | | 318/400.3 |
| 2012/0098470 A1 * | 4/2012 | Itou | ............... | H02P 29/0241 |
| | | | | 318/139 |
| 2013/0043337 A1 * | 2/2013 | Rukavina | ............... | A47J 31/40 |
| | | | | 241/68 |
| 2013/0220764 A1 * | 8/2013 | Choi | ............... | F16D 11/10 |
| | | | | 192/69.8 |
| 2015/0097501 A1 * | 4/2015 | Yamane | ............... | B60L 1/00 |
| | | | | 318/400.3 |
| 2015/0182065 A1 * | 7/2015 | Kim | ............... | A47J 19/025 |
| | | | | 99/492 |
| 2015/0188450 A1 * | 7/2015 | Xia | ............... | H02M 7/217 |
| | | | | 363/53 |
| 2015/0375959 A1 * | 12/2015 | Agirman | ............... | B66B 1/302 |
| | | | | 187/247 |
| 2016/0256839 A1 * | 9/2016 | Dickson, Jr. | ............... | B01F 15/00305 |
| 2017/0197191 A1 * | 7/2017 | Goodson | ............... | B01F 15/00389 |

* cited by examiner

MOTOR DRIVING CIRCUIT, APPLICATION DEVICE INCLUDING THE SAME, AND BRAKING METHOD FOR A MOTOR

CROSS REFERENCE TO RELATED APPLICATIONS

This non-provisional patent application claims priority under 35 U.S.C. § 119(a) from Patent Application No. 201610800679.1 filed in The People's Republic of China on Sep. 1, 2016, and Patent Application No. 201610800678.7 filed in The People's Republic of China on Sep. 1, 2016, the entire contents of which are hereby incorporated by reference.

FIELD OF THE INVENTION

The present invention relates to motor control fields, and in particular to a motor driving circuit capable of quick braking, an application device including the motor driving circuit, and a method for braking the motor.

BACKGROUND OF THE INVENTION

Food processors such as juicers or blenders are appliances frequently used in people's daily lives. Food processors typically employ a motorized cutting tool which rotates at high speed to cut the food. However, this processing manner has a potential risk. If the motor and cutting tool cannot stop in time in case a top cover is unintentionally opened during operation of the food processor, the food processor may cause damage to a user. IEC (international electrotechnical commission) safety standards require a cutter of the food processor to stop in 1.5 seconds in case of emergency such as when the top cover of the food processor is opened or moved away. Many commercial available food processors cannot satisfy the IEC safety standards. In addition, some food processors employ a special mechanism such that the top cover cannot be opened before the motor stops. However, this increases cost of the food processor.

In addition, during the emergency stopping process of the motor when the top cover of the food processor is suddenly opened, regenerated energy that is produced by continuing rotation of the motor due to inertia imposes an overvoltage risk on the motor, which may decrease a lifespan of internal components of a motor driving circuit.

SUMMARY OF THE INVENTION

Accordingly, in one aspect thereof, the present invention provides a motor driving circuit includes an inverter, a braking unit, and a MCU. The inverter is configured to drive a motor. The braking unit includes a sampling circuit, a discharge circuit, and a switch group. The sampling circuit and the discharge circuit are connected to the inverter, and the switch group is configured to output an emergency signal when an emergency occurs. The MCU is connected to the sampling circuit, the discharge circuit, and the switch group, and is configured to control the sampling circuit to detect a voltage across the inverter and obtain a detected value when receiving the emergency signal, compare the detected value to a preset voltage or a preset voltage range, and transmit a control signal to activate the discharge circuit when the detected value is greater than the preset voltage or exceeds the preset voltage range.

Preferably, the motor driving circuit includes an AC-DC converter circuit, the AC-DC converter circuit includes a switch component, a rectifier and a capacitor, the switch component is configured to control connection of the rectifier to an AC power source, the rectifier is connected to the inverter and configured to convert AC voltage from the AC power source into DC voltage, and the capacitor is connected between two input terminals of the inverter.

Preferably, the switch component is a SPDT relay which includes a coil, a first contact, a second contact, and a third contact, the third contact is connected to the AC power source, the first contact is connected to the rectifier, the second contact is null, when the coil is energized, the third contact is connected to the first contact, and when the emergency occurs, the coil is de-energized, the third contact is connected to the second contact.

Preferably, the sampling circuit is connected between two input terminals of the inverter, and includes at least two series-connected resistors.

Preferably, the discharge circuit is connected between two input terminals of the inverter, and includes a control switch and a power resistor connected in series, and the control switch is connected to the MCU to receive the control signal.

Preferably, the switch group includes an interlock switch, and two resistors, the interlock switch and the coil of the SPDT relay are connected in series between a power source and a ground, the two resistors are connected in series between two ends of the coil of the SPDT relay, and a node of the two resistors is connected to the MCU.

Preferably, the discharge circuit includes a control switch, a heating element, and a changeover switch, the changeover switch is configured to selectively connect the heating element to an AC power source or the inverter under the control of the MCU, the control switch is connected in series with the heating element between two input terminals of the inverter, and is connected to the MCU to receive the control signal.

Preferably, the changeover switch is a double pole double throw (DPDT) relay, the driving circuit further includes a controllable bidirectional AC switch, the DPDT relay has first to sixth contacts, a first anode of the controllable bidirectional AC switch is connected to an output terminal of the AC power source, a second anode of the controllable bidirectional AC switch is connected with a first contact of the DPDT relay, a control terminal of the controllable bidirectional AC switch is connected to the MCU, a second contact of the DPDT relay is connected to another output terminal of the AC power source, a third contact and a fourth contact of the DPDT relay are respectively connected to two ends of the heating element, a fifth contact of the DPDT relay is connected to a first end of the control switch, a sixth contact of the DPDT relay is connected to an input terminal of the inverter, and a second end of the control switch is connected to another input terminal of the inverter, and a control end of the control switch is connected to the MCU to receive the control signal.

Preferably, the driving circuit further includes a gate driving circuit connected between the MCU and the control terminal of the controllable bidirectional AC switch.

Preferably, the MCU transmits a braking signal to the inverter when receiving the emergency signal.

According to a second aspect, the present invention provides an application device including a motor and a motor driving circuit. The motor driving circuits an inverter, a braking unit, and a MCU. The inverter is configured to drive a motor, and includes two input terminals. The braking unit includes a sampling circuit, a discharge circuit, and a switch group. The sampling circuit and the discharge circuit are connected to the inverter, and the switch group is configured to output an emergency signal when an emergency occurs. The MCU is connected to the sampling circuit, the discharge circuit, and the switch group, and is configured to control the sampling circuit to detect a voltage across the inverter and obtain a detected value when receiving the emergency signal, compare the detected value to a preset voltage or a preset voltage range, and transmit a control signal to activate the discharge circuit when the detected value is greater than the preset voltage or exceeds the preset voltage range.

Preferably, the application device includes a cover connected to the switch group, and the MCU receives the emergency signal when the top cover is open during the motor running.

Preferably, the discharge circuit includes a control switch and a power resistor connected in series, and the control switch is connected to the MCU to receive the control signal.

Preferably, the discharge circuit includes a control switch, a heating element, and a changeover switch, the changeover switch is connected to the MCU to selectively connect the heating element to a power source or the inverter, the control switch is connected in series with the heating element between two input terminals of the inverter, and is connected to the MCU to receive the control signal.

According to a third aspect, the present invention provides a method for braking a motor, the motor is driven by the motor driving circuit, the method includes:

receiving the emergency signal;

detecting the voltage value across the inverter to obtain the detected value;

comparing the detected value to the preset voltage value or the preset voltage range; and transmitting the control signal to the control switch to activate the discharge circuit when the detected value is greater than the preset voltage or exceeds the preset voltage range.

Preferably, the method further includes: transmitting a braking PWM signal to the inverter when receiving the emergency signal.

Preferably, when the detected value is less than or equal to the preset voltage value or does not exceed the preset voltage range, the method returns to the detecting step.

Preferably, the control signal to the control switch is a PWM signal with a duty ratio corresponding to energy required to stop the motor, a required stop time, and peak power and peak current of a power resistor in the discharge circuit.

Preferably, the discharge circuit includes a control switch, a heating element, and a changeover switch, the changeover switch is configured to selectively connect the heating element to an AC power source or the inverter under the control of the MCU, the control switch is connected in series with the heating element between two input terminals of the inverter, and is connected to the MCU to receive the control signal; the method further comprises:

transmitting a control signal to the changeover switch to connect the heating element to the inverter when receiving the emergency signal.

The motor driving circuit of embodiments of the present invention employs a discharge circuit, which can consume the regenerated energy produced by continuing rotation of the motor due to inertia, so as to reduce or eliminate the overvoltage risk of the capacitor or inverter. In addition, the motor driving circuit has a reduced cost, simplified structure, improved responsiveness and quick braking capability.

DETAILED DESCRIPTION OF THE PREFERRED EMBODIMENTS

Figure 1:
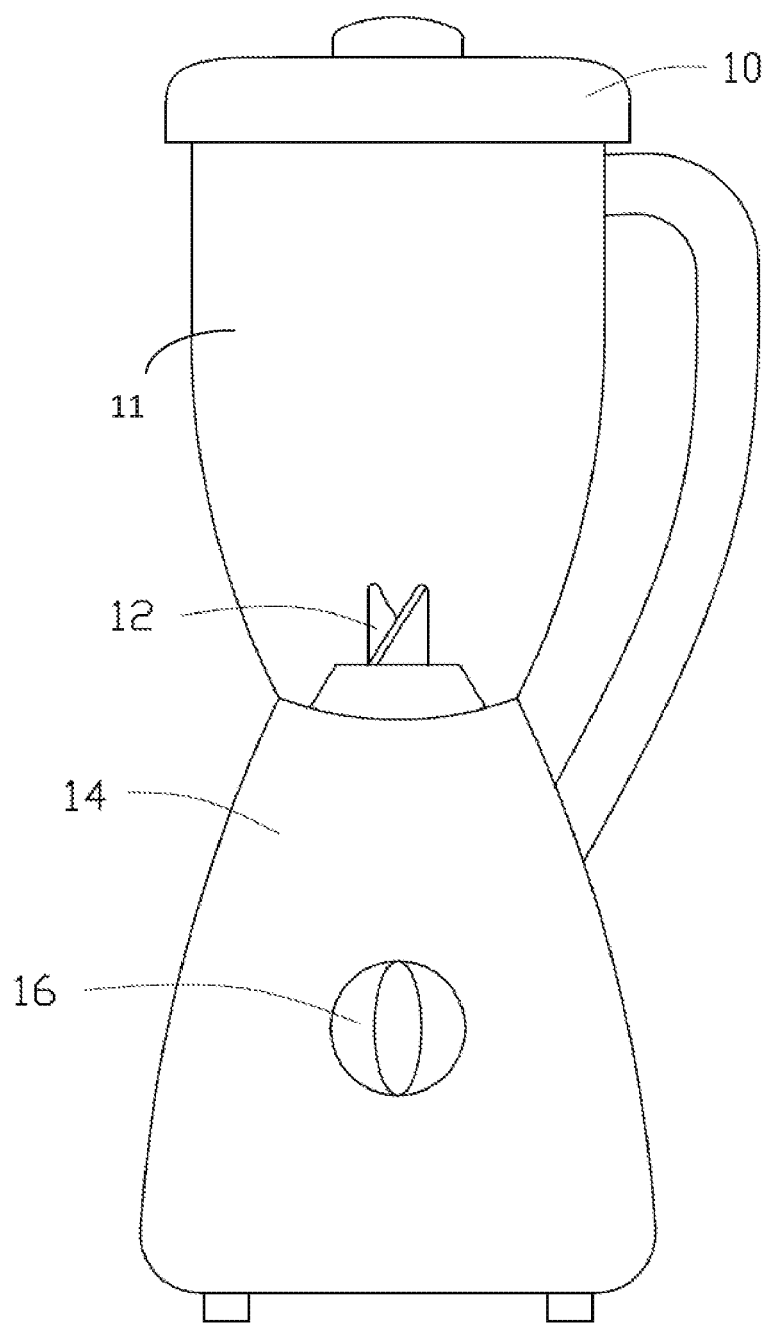
FIG. 1 is a perspective view of a food processor according to an embodiment of the present invention.

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention. It should be noted that the figures are illustrative rather than limiting. The connections illustrated in the Figures are for the purposes of clear illustration only and should not be used to limit the present invention to any particular connection. In the figures, identical structures, elements or parts that appear in more than one figure are generally labeled with a same reference numeral in all the figures in which they appear.

It is noted that, when a component is described to be "connected" to another component, it can be directly fixed to the another component or there may be an intermediate component. Unless otherwise specified, all technical and scientific terms used in this disclosure have the ordinary meaning as commonly understood by people skilled in the art. The terms used in this disclosure are for the purposes of describing the embodiments only and should be regarded as limiting.

FIG. 1 illustrates a food processor according to one embodiment of the present invention. As shown in FIG. 1, the food processor includes a top cover 10, a container 11, a cutting tool 12, a bottom base 14, and a switch 16. The top cover 10 is connected to an interlock switch 161 (FIG. 2) of a motor driving circuit. Depending on different types of operation, the cutting tool 12 may include a slicing cutter, a grater, reamer, a cross blade, a noodle cutter, and a mixer. A motor 120 and its driving circuit are mounted in an interior of the bottom base 14. The switch 16 is configured to allow a user to select an operation mode of the food processor.

Figure 2:
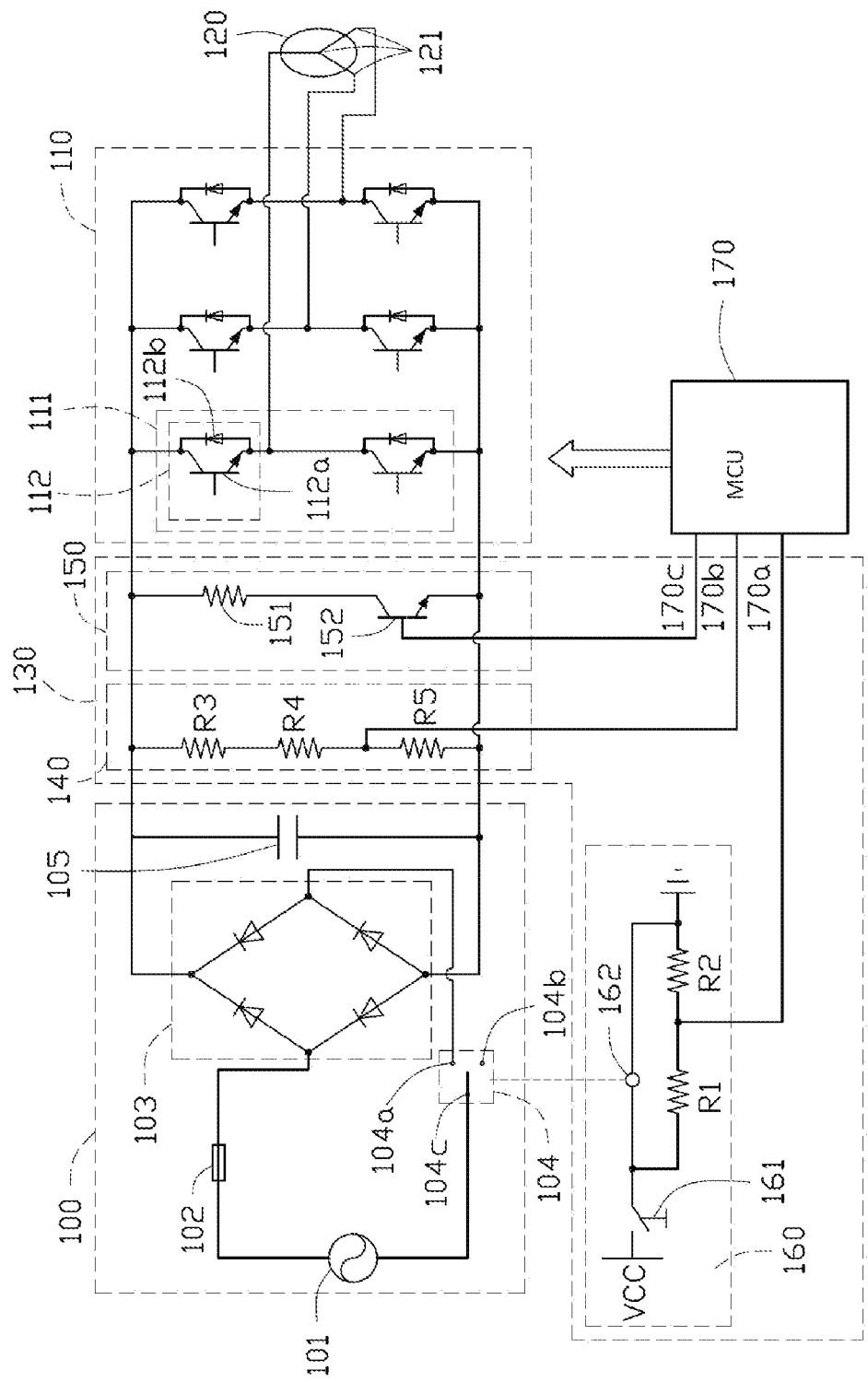
FIG. 2 is a circuit diagram of a motor driving circuit according to a first embodiment of the present invention.

FIG. 2 is a circuit diagram of the motor driving circuit according to an embodiment of the present invention. The motor driving circuit includes an inverter 110, a braking unit 130, and a MCU 170. The inverter 110 is configured to convert direct current (DC) power into alternating current (AC) power. The braking unit 130 is configured to cooperate with the MCU 170 in case of emergency to stop the motor 120 and discharge regenerated energy (electrical energy) that is produced by the motor 120 before the motor 120 stops. The motor 120 is for example a brushless direct current (BLDC) motor.

The motor driving circuit further includes an AC-DC converter circuit 100 which includes an AC power source 101, a rectifier 103, a switch component 104, and a capacitor 105. The AC power source 101 supplies the AC power. The AC power may be a commercial AC power (110V/220V). The rectifier 103 is configured to rectify the AC power from the AC power source 101 into DC power, and the rectifier 103 may be a diode bridge rectifier. The switch component 104 is a single pole double throw (SPDT) relay, which includes a coil 162, a first contact 104a, a second contact 104b, and a third contact 104c connected to an output terminal of the AC power source 101. The first contact 104a is connected to an input terminal of the rectifier 103. The second contact 104b is null. The capacitor 105 is connected between output terminals of the rectifier 103. Preferably, the AC-DC converter circuit 100 can further include a fuse 102 connected between the AC power source 101 and the rectifier 103.

The inverter 110 is a three-phase bridge inverter and is configured to convert DC power from the capacitor 105 into a three-phase AC power with multiple frequencies. The inverter 110 includes three inverting circuits 111 each connected in parallel with the capacitor 105. Each inverting circuit 111 includes two inverting components 112 connected in series and an output terminal. The output terminal of each inverting circuit 111 is connected to between the two series-connected inverting components 112. Each inverting component 112 includes a transistor 112a and a diode 112b connected in parallel with each other.

The motor 120 includes three-phase AC electrical energy input terminals each connected to a corresponding one of the output terminals of the inverting circuits 111, such that the motor 120 receives a three-phase AC electrical energy from the inverter 110.

The braking unit 130 includes a sampling circuit 140, a discharge circuit 150, and a switch group 160. The sampling circuit 140 includes at least two resistors. In this embodiment, the sampling circuit 140 includes three resistors R3, R4, and R5, which are first connected in series then connected in parallel with the capacitor 105. The discharge circuit 150 includes a power resistor 151 and a control switch 152. The control switch 152 may be an insulated gate bipolar transistor (IGBT). One end of the power resistor 151 is connected to an input terminal of the inverter 110, the other end of the power resistor 151 is connected to a collector of the IGBT, and an emitter of the IGBT is connected to another input terminal of the inverter 110. The switch group 160 includes the interlock switch 161, the SPDT relay coil 162, and resistors R1 and R2. The interlock switch 161 and the SPDT relay coil 162 are connected in series between a power source VCC and the ground. The resistors R1 and R2 are connected in series, and the series-connected resistors R1, R2 are connected in parallel with the SPDT relay coil 162. The interlock switch 161 is configured to detect the opening/closure of the top cover 10. The interlock switch 161 is turned on when the top cover 10 is mounted on the open top of the container 11, and the interlock switch 161 is turned off when the top cover 10 is open or removed from the container 11.

The MCU 170 includes a first connecting port 170a, a second connecting port 170b, and a third connecting port 170c. The first connecting port 170a is connected to a node between the series-connected resistors R1 and R2 of the switch group 160, and is configured to detect a state of the interlock switch 161 and receives a voltage level signal. The second connecting port 170b is connected to between any two resistors of the sampling circuit 140, is configured to detect a voltage across the inverter and deliver the voltage value to the MCU 170. The third connecting port 170c is connected to a base of the IGBT of the discharge circuit, and is configured to transmit a control signal from the MCU 170 to the IGBT to activate the discharge circuit 150 to start a discharge operation.

When the food processor is in normal operation, the motor driving circuit operates as follows. Firstly, the top cover 10 of the food processor is closed, and the interlock switch 161 is turned on, the SPDT relay coil 162 is energized. The third contact 104c of the switch component 104 contacts the first contact 104a, the AC power supplied by the AC power source 101 is rectified by the rectifier 103 into DC power which is delivered to the inverter 110 and also to the capacitor 105 to charge the capacitor 105. At the same time, the first connecting port 170a detects that the interlock switch 161 is turned on, and outputs a high level signal to the MCU 170. The MCU 170 delivers an operation PWM signal to the inverter 110 to make the inverter 110 convert the DC power into AC power for the motor 120 to rotate the motor 120.

The second connecting port 170b detects in real time a voltage across the inverter and delivers a detected voltage value (detected value) to the MCU 170. The MCU 170 compares the detected value to a preset voltage value or a preset voltage range to determine whether the capacitor 105 and the inverter 110 are in an overvoltage state.

In case of emergency of the food processor, the motor driving circuit operates as follows. During operation of the food processor, if the top cover 10 is suddenly opened, the interlock switch 161 is switched to an off state, the SPDT relay coil 162 is de-energized. The third contact 104c of the switch component 104 contacts the second contact 104b, thereby shutting off the power supply to the motor 120. At the same time, the first connecting port 170a detects that the interlock switch 161 is turned off, and receives an emergency signal with low voltage. The MCU 170 delivers a braking PWM signal to the inverter 110 to control the motor 120 to stop. The second connecting port 170b detects and delivers a voltage value (detected value) across the inverter to the MCU 170, and the MCU 170 compares the detected value to a preset voltage value or a preset voltage range. When the detected value is greater than the preset voltage value or exceeds the preset voltage range, the MCU 170 transmits a control signal to the control switch 152 through the third connecting port 170c, to turn on the control switch 152. In this case, the regenerated energy produced by continuing rotation of the motor 120 due to inertia is consumed by the power resistor 151, thereby reducing or eliminating the overvoltage risk of the capacitor 105 and the inverter 110.

Figure 3:
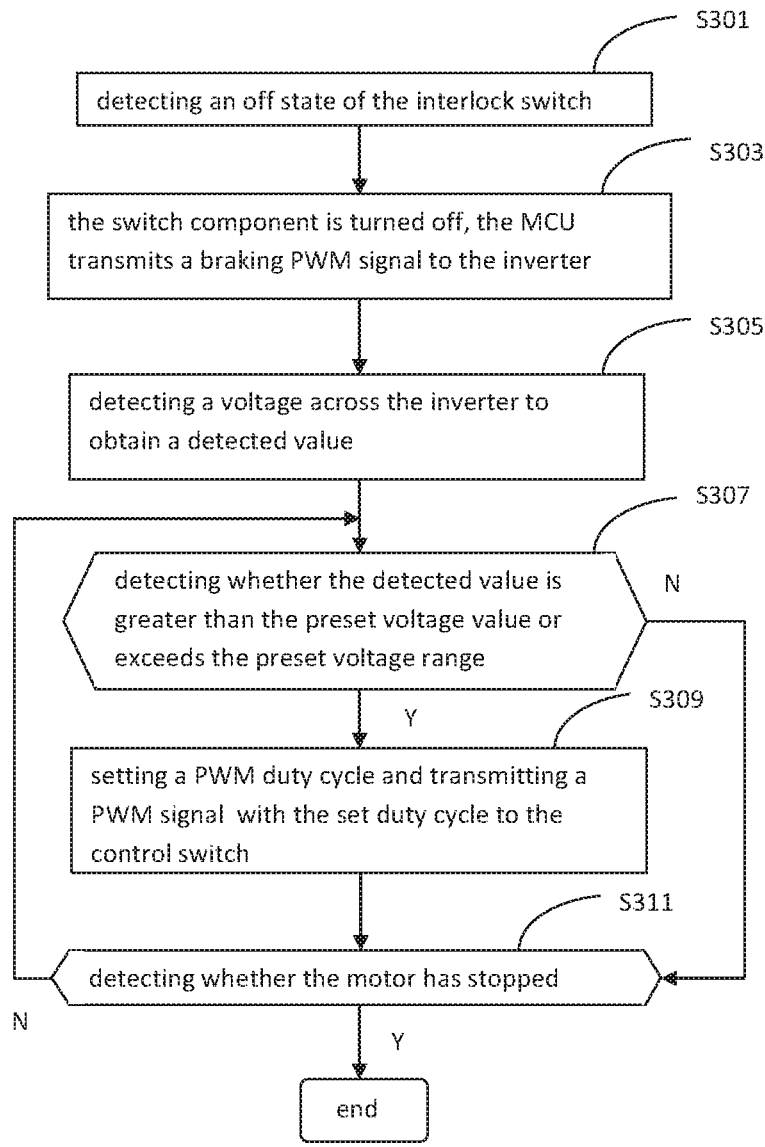
FIG. 3 is a flow chart of a braking method for the motor driving circuit of FIG. 2.

FIG. 3 is a flow diagram of a braking method of the motor driving circuit of FIG. 2 in case of emergency of the food processor. During operation of the food processor, if the top cover 10 of the food processor is suddenly opened, the motor driving circuit performs the following steps.

At step S301, detecting an off state of the interlock switch 161 when the top cover 10 is opened. In this embodiment, the interlock switch 161 is configured to detect the opening/closure of the top cover 10. The interlock switch 161 is turned on when the top cover 10 is mounted on the open top of the container 11. In case of emergency, such as, when the top cover 10 of the food processor is suddenly opened or removed away from the container 11, the interlock switch 161 is turned off to output an emergency signal.

At step S303, the switch component 104 is turned off to stop the power supply from the AC power source to the motor 120. In this embodiment, when the interlock switch 161 is tuned off, the relay coil 162 of the SPDT is de-energize, and the switch component 104 is turned off to brake the electrical connection between the rectifier 103 and the AC power source 101, thereby interrupting the power supply to the motor 120.

At step S305, the MCU 170 detects a voltage across the inverter 110 to obtain a detected value.

At step S307, comparing the detected value to a preset voltage value or a preset voltage range to determine whether the detected value is greater than the preset voltage value or exceeds the preset voltage range. In this embodiment, step S309 is implemented if the detected value is greater than the preset voltage value or exceeds the preset voltage range. Step S311 is implemented if the detected value is less than or equal to the preset voltage value or within the preset voltage range.

At step S309, setting a PWM duty cycle and transmitting a PWM signal with the set duty cycle to the control switch 152 to activate the discharge circuit. In this embodiment, the MCU 170 transmits the control signal to the control switch 152 to turn on the control switch 152. The PWM duty cycle is dependent on the energy required to stop the motor, the required stop time, and the peak power and peak current of the power resistor. The energy required to stop the motor is in direct proportion to a rotation speed of the motor, the inertia of a rotor of the motor, and the inertia of a load. It should be understood that when a greater energy is required to stop the motor, the motor is required to stop in a shorter time, and the power resistor has a lower peak power and a lower peak current, the PWM control signal is required to have a greater duty cycle.

At step S311, detecting whether the motor has stopped. When the motor has stopped, the work flow ends. When the motor is still operating, the work flow returns to step S307.

In this embodiment, the power supply to the motor 120 is automatically shut off by the driving circuit without the need of control by the MCU 170, so as to ensure that the motor 120 stops running even if the MCU operates abnormally, thereby increasing user safety. In addition, the work flow is performed very quickly, such that the motor 120 can stop in a short time, such as 1 second or less than 1 second, which fully complies with the IEC safety standards.

In summary, the embodiments of the present invention provides a motor driving circuit, which has simple electronic components, concise circuit structure, and eliminates the need of additional devices such as a complicated and expensive locking arm as a safety protection mechanism for the food processor, thereby resulting in a lower product cost.

Figure 4:
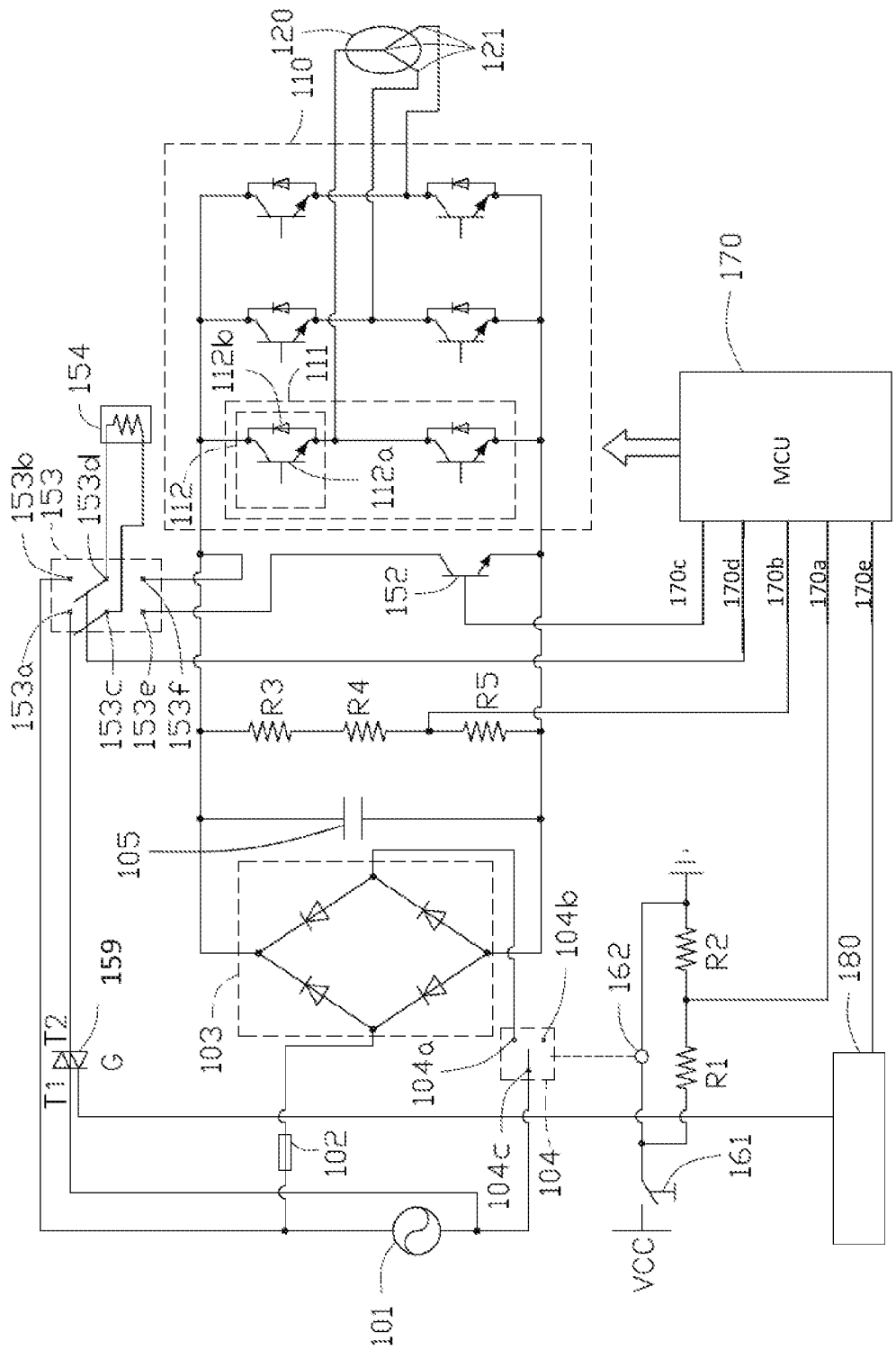
FIG. 4 is a circuit diagram of a motor driving circuit according to a second embodiment of the present invention.

FIG. 4 is a circuit diagram of a motor driving circuit according to a second embodiment of the present disclosure. In the embodiment, the motor driving circuit includes an inverter 110, a braking unit, an AC-DC converter circuit 100, and a MCU 170. The AC-DC converter circuit 100 includes an AC power source 101, a rectifier 103, a switch component 104, a fuse 102, and a capacitor 105. The main difference between this embodiment and the first embodiment is that, the discharging circuit includes a heating circuit, and the MCU 170 further includes a fourth connecting port 170d, and a fifth connecting port 170e.

The heating circuit includes a control switch 152, a heating element 154, and a changeover switch 153. The changeover switch 153 is a double pole double throw (DPDT) relay. The heating circuit further includes an AC switch circuit which includes a controllable bidirectional AC switch 159 and a gate driving circuit 180. The gate driving circuit 180 is configured to turn on the controllable bidirectional AC switch 159 under the control of the MCU 170. The controllable bidirectional AC switch 159 can be a TRIAC. The TRIAC includes a control terminal G connected to the gate driving circuit 180, a first anode T1 connected to an output terminal of the AC power source 101, and a second anode T2 connected to a first contact 153a of the DPDT relay. A second contact 153b of the DPDT relay is connected to another output terminal of the AC power source 101, and a third contact 153c and a fourth contact 153d of the DPDT relay are respectively connected to two ends of the heating element 154. When the third contact 153c and the fourth contact 153d of the DPDT relay respectively contact the first contact 153a and the second contact 153b of the DPDT relay and the controllable bidirectional AC switch is turned on, a first heating loop circuit including the AC power source 101, the controllable bidirectional AC switch 159, and the heating element 154 is formed. The control switch 152 may be an insulated gate bipolar transistor (IGBT). A fifth contact 153e of the DPDT relay is connected to a collector of the IGBT, a sixth contact 153f of the DPDT relay is connected to an input terminal of the inverter 110, and an emitter of the IGBT is connected to another input terminal of the inverter 110. When the third contact 153c and the fourth contact 153d of the DPDT relay respectively contact the fifth contact 153e and the sixth contact 153f of the DPDT relay and the control switch 152 is turned on, a second heating loop circuit including the inverter 110, the control switch 152, and the heating element 154 is formed.

The first heating loop circuit and the second heating loop circuit share the heating element 154. In which a current passes through the first and second heating loop circuits is selectively in accordance with switch operation of the DPDT relay.

The fifth connecting port 170e of the MCU 170 is connected to the gate driving circuit 180, such that the MCU 170 can transmit a driving signal to the gate driving circuit 180 through the fifth connecting port 170e. The first connecting port 170a is connected to a node between the series-connected resistors R1 and R2 of the interlock switch group, such that the MCU 170 can detect an emergency using the interlock switch group. Specifically, an ON/OFF state of the interlock switch 161 is determined by detecting an electrical potential of the resistors R1 and R2, thereby detecting whether an emergency occurs. The second connecting port 170b is connected to between any two resistors of the sampling circuit, such that the MCU 170 can obtain a detected value of the voltage across the inverter using the sampling circuit in case of the emergency. The fourth connecting port 170d is connected to the DPDT relay, such that the MCU 170 can transmit a control signal to the DPDT relay to switch the DPDT relay between a first position and the second position according to the state of the interlock switch 161. The third connecting port 170c is connected to a base of the IGBT, to control the control switch 152 to turn on when the detected value of the voltage exceeds a preset voltage value or a preset voltage range. In the first position, the third contact 153c and the fourth contact 153d of the DPDT relay respectively contact the first contact 153a and the second contact 153b of the DPDT relay. In the second position, the third contact 153c and the fourth contact 153d of the DPDT relay respectively contact the fifth contact 153e and the sixth contact 153f of the DPDT relay.

The heating function and motor rotation function of the food processor can perform separately.

When the food processor is in normal operation, the motor driving circuit operates as follows. Firstly, the top cover 10 of the food processor is closed, and the interlock switch 161 is turned on. The third contact 104c of the switch component 104 contacts the first contact 104a of the SPDT relay, the AC power supplied by the AC power source 101 is rectified by the rectifier 103 into DC power which is delivered to the inverter 110 and also to the capacitor 105 to charge the capacitor 105. At the same time, the first connecting port 170a detects that the interlock switch 161 is turned on, and outputs a high level signal to the MCU 170. The MCU 170 delivers an operation PWM signal to the inverter 110 to make the inverter 110 convert the DC power into AC power for the motor 120 to rotate the motor. At the same time, the MCU 170 delivers a control signal to the DPDT relay through the fourth connecting port 170d to turn the DPDT relay to the first position, such that the third contact 153c and the fourth contact 153d of the DPDT relay contact the first contact 153a and the second contact 153b of the DPDT relay, respectively. Upon receiving of an external instruction, such as when a user presses a heating button, the MCU 170 delivers a driving signal to the gate driving circuit 180 through the fifth connecting port 170e, and then delivers the driving signal from the gate driving circuit 180 to activate the controllable bidirectional AC switch 159 to form the first heating loop circuit.

The second connecting port 170b detects in real time a voltage across the inverter and delivers a detected voltage value (detected value) to the MCU 170. The MCU 170 compares the detected value to a preset voltage value or a preset voltage range to determine whether the capacitor 105 and the inverter 110 are in an overvoltage state.

In case of emergency of the food processor, the motor driving circuit operates as follows. During operation of the food processor, if the top cover 10 is suddenly opened, the interlock switch 161 is turned off. The third contact 104c of the SPDT rely contacts the second contact 104b of the SPDT relay, thereby shutting off the power supply to the motor 120. At the same time, the first connecting port 170a detects that the interlock switch 161 is turned off, and receives an emergency signal with a low voltage level. The MCU 170 delivers a braking PWM signal to the inverter 110 to control the motor 120 to stop. At the same time, the MCU 170 delivers a control signal to the DPDT relay through the fourth connecting port 170d to turn the DPDT relay to the second position, such that the third contact 153c and the fourth contact 153d of the DPDT relay contact the fifth contact 153e and the sixth contact 153f of the DPDT relay, respectively. The second connecting port 170b detects a voltage value (detected value) across the inverter to the MCU 170, and the MCU 170 compares the detected value to a preset voltage value or a preset voltage range. When the detected value is greater than the preset voltage value or exceeds the preset voltage range, the MCU 170 transmits a control signal to the control switch 152 through the third connecting port 170c to form the second heating loop circuit.

In this embodiment, the regenerated energy produced by continuing rotation of the motor 120 due to inertia is consumed by the heating element 154, thereby reducing or eliminating the overvoltage risk of the capacitor 105 and the inverter 110.

Figure 5:
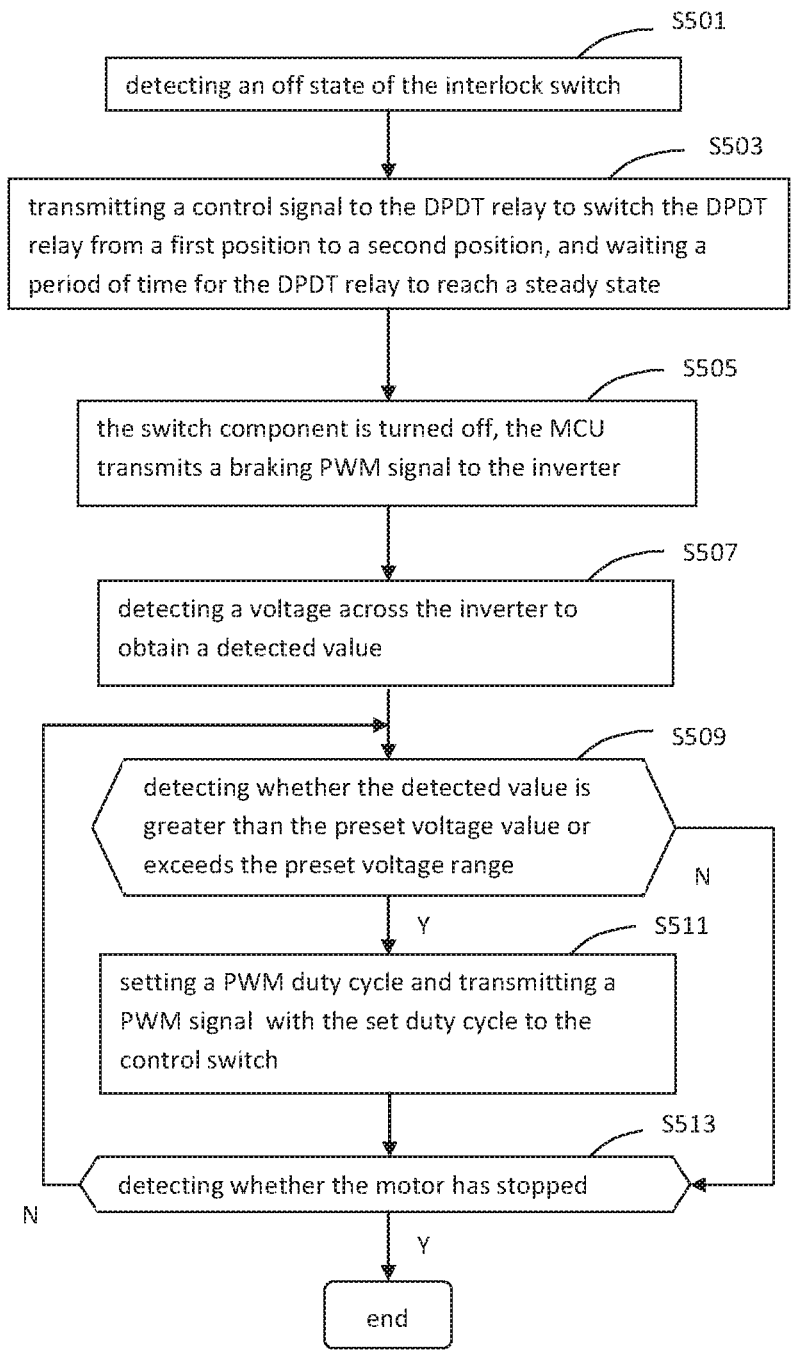
FIG. 5 is a flow chart of a braking method for the motor driving circuit of FIG. 4.

FIG. 5 is a flow diagram of a braking method of the motor driving circuit of FIG. 4 in case of emergency of the food processor. During operation of the food processor, if the top cover 10 of the food processor is suddenly opened, the motor driving circuit performs the following steps.

At step S501, detecting an off state of the interlock switch 161 when the top cover 10 is opened.

In this embodiment, the interlock switch 161 is configured to detect the opening/closure of the top cover 10. The interlock switch 161 is turned on when the top cover 10 is mounted on the open top of the container 11. In case of emergency, such as, when the top cover 10 of the food processor is suddenly opened or removed away from the container 11, the interlock switch 161 is turned off to output an emergency signal.

At step S503, the DPDT relay receives a control signal from the processor 170, the third contact 153c and the fourth contact 153d of the DPDT relay respectively contact the fifth contact 153e and the sixth contact 153f of the DPDT relay. In this embodiment, the MCU 170 transmits the control signal to the DPDT relay to control the DPDT relay to switch between the first position and the second position. When the third contact 153c and the fourth contact 153d of the DPDT relay respectively contact the fifth contact 153e and the sixth contact 153f of the DPDT relay, it needs to wait a period of time for the DPDT relay to reach a steady state.

At step S505, the switch component 104 is turned off to stop the power supply from the AC power source to the motor 120. In this embodiment, when the interlock switch 161 is tuned off, the relay coil 162 of the SPDT is de-energize, and the switch component 104 is turned off to brake the electrical connection between the rectifier 103 and the AC power source 101, thereby stopping the power supply to the motor 120.

At step S507, the MCU 170 detects a voltage across the inverter 110 to obtain a detected value.

At step S509, comparing the detected value to a preset voltage value or a preset voltage range to determine whether the detected value is greater than the preset voltage value or exceeds the preset voltage range. In this embodiment, step S511 is implemented if the detected value is greater than the preset voltage value or exceeds the preset voltage range. Step S513 is implemented if the detected value is less than or equal to the preset voltage value or within the preset voltage range.

At step S511, setting a PWM duty cycle and transmitting a PWM signal with the set duty cycle to the control switch 152 to activate the discharge circuit. In this embodiment, the MCU 170 transmits the control signal to the control switch 152 to turn on the control switch 152. The PWM duty cycle is dependent on the energy required to stop the motor, the required stop time, and the peak power and peak current of the heating element 151. The energy required to stop the motor is in direct proportion to a rotation speed of the motor, the inertia of a rotor of the motor, and the inertia of a load. It should be understood that when a greater energy is required to stop the motor, the motor is required to stop in a shorter time, and the heating element has a lower peak power and a lower peak current, the PWM control signal is required to have a greater duty cycle.

At step S513, detecting whether the motor has stopped. When the motor has stopped, the work flow ends. When the motor is still operating, the work flow returns to step S509.

In comparison with the first embodiment, the second embodiment employs the heating element 154 to recycle the regenerated energy of the motor 120, which is not only space saving, but also increase power usage efficiency.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A motor driving circuit comprising:
an inverter configured to convert direct current (DC) power into alternating current (AC) power to drive a motor;
a braking unit comprising a sampling circuit, a discharge circuit and a switch group, the sampling circuit and the discharge circuit being connected to the inverter, the switch group being configured to output an emergency signal when an emergency occurs;

a Microcontroller Unit (MCU) connected to the sampling circuit, the discharge circuit, and the switch group, and configured to control the sampling circuit to detect a voltage across the inverter and obtain a detected value when receiving the emergency signal, compare the detected value to a preset voltage or a preset voltage range, and transmit a control signal to activate the discharge circuit when the detected value is greater than the preset voltage or exceeds the preset voltage range, wherein the motor driving circuit comprises a switch component, the switch component is a SPDT relay which comprises a coil, a first contact, a second contact, and a third contact, the third contact is connected to the AC power source, the second contact is null, the first contact is connected to a rectifier, when the coil is energized, the third contact is connected to the first contact, and when the emergency occurs, the coil is de-energized, the third contact is connected to the second contact, and wherein the switch group comprises an interlock switch, and two resistors, the interlock switch and the coil of the SPDT relay are connected in series between a power source and the ground, the two resistors are connected in series between two ends of the coil of the SPDT relay, and a node of the two resistors is connected to the MCU.

2. The motor driving circuit according to claim 1, wherein the motor driving circuit comprises an AC-DC converter circuit, the AC-DC converter circuit comprises the switch component, the rectifier and a capacitor, the switch component is configured to control connection of the rectifier to an AC power source, the rectifier is connected to the inverter and configured to convert AC voltage from the AC power source into DC voltage, and the capacitor is connected between two input terminals of the inverter.

3. The motor driving circuit according to claim 1, wherein the sampling circuit is connected between two input terminals of the inverter, and comprises at least two series-connected resistors.

4. The motor driving circuit according to claim 1, wherein the discharge circuit is connected between two input terminals of the inverter, and comprises a control switch and a power resistor connected in series, the control switch is connected to the MCU to receive the control signal.

5. The motor driving circuit according to claim 1, wherein the discharge circuit comprises a control switch, a heating element, and a changeover switch, the changeover switch is configured to selectively connect the heating element to an AC power source or the inverter under the control of the MCU, the control switch is connected in series with the heating element between two input terminals of the inverter, and is connected to the MCU to receive the control signal.

6. The motor driving circuit according to claim 5, wherein the changeover switch is a double pole double throw (DPDT) relay, the driving circuit further comprises a controllable bidirectional AC switch, the DPDT relay has first to sixth contacts, a first anode of the controllable bidirectional AC switch is connected to an output terminal of the AC power source, a second anode of the controllable bidirectional AC switch is connected with a first contact of the DPDT relay, a control terminal of the controllable bidirectional AC switch is connected to the MCU, a second contact of the DPDT relay is connected to another output terminal of the AC power source, a third contact and a fourth contact of the DPDT relay are respectively connected to two ends of the heating element, a fifth contact of the DPDT relay is connected to a fist end of the control switch, a sixth contact of the DPDT relay is connected to an input terminal of the inverter, and a second end of the control switch is connected to another input terminal of the inverter, and a control end of the control switch is connected to the MCU to receive the control signal.

7. The motor driving circuit according to claim 6, wherein the driving circuit further comprises a gate driving circuit connected between the MCU and the control terminal of the controllable bidirectional AC switch.

8. The motor driving circuit according to claim 1, wherein the MCU transmits a braking signal to the inverter when receiving the emergency signal.

9. An application device, comprising:
a motor; and
a motor driving circuit according to claim 1.

10. The application device according to claim 9, wherein the application device is a food processor and comprises a cover connected to the switch group, and the MCU receives the emergency signal when the top cover is opened during the motor running.

11. The application device according to claim 9, wherein the discharge circuit comprises a control switch and a power resistor connected in series, and the control switch is connected to the MCU to receive the control signal.

12. The application device according to claim 9, wherein the discharge circuit comprises a control switch, a heating element, and a changeover switch, the changeover switch is connected to the MCU to selectively connect the heating element to a power source or the inverter, the control switch is connected in series with the heating element between two input terminals of the inverter, and is connected to the MCU to receive the control signal.

13. A method for braking a motor, the motor is driven by the motor driving circuit according to claim 1, the method comprising:
receiving the emergency signal;
stopping providing power to the inverter when receiving the emergency signal;
detecting the voltage value across the inverter to obtain the detected value;
comparing the detected value to the preset voltage value or the preset voltage range; and
transmitting the control signal to the control switch to activate the discharge circuit when the detected value is greater than the preset voltage or exceeds the preset voltage range.

14. The method according to claim 13, wherein the method further comprises:
transmitting a braking PWM signal to the inverter when receiving the emergency signal.

15. The method according to claim 13, wherein when the detected value is less than or equal to the preset voltage value or does not exceed the preset voltage range, the method returns to the detecting step.

16. The method according to claim 13, wherein the control signal to the control switch is a PWM signal with a duty ratio corresponding to energy required to stop the motor, a required stop time, and peak power and peak current of a power resistor in the discharge circuit.

17. The method according to claim 13, wherein the discharge circuit comprises a control switch, a heating element, and a changeover switch, the changeover switch is configured to selectively connect the heating element to an AC power source or the inverter under the control of the MCU, the control switch is connected in series with the heating element between two input terminals of the inverter, and is connected to the MCU to receive the control signal, the method further comprises:

transmitting a control signal to the changeover switch to connect the heating element to the inverter when receiving the emergency signal.

* * * * *